Patented Oct. 1, 1940

2,216,536

UNITED STATES PATENT OFFICE 2,216,536

PROCESS FOR TREATING TITANIUM PIGMENTS

Willard H. Madson and William H. Daiger, Linthicum Heights, Md., assignors to E. I. du Pont de Nemours & Company, Wilmington, Del., a corporation of Delaware No Drawing. Application April 21, 1937, Serial No. 138,164

11 Claims. (Cl. 134—58)

The present invention relates to a process for producing titanium pigments which pigments are free from objectionable grit particles. More particularly, the present invention relates to the production of titanium dioxide pigments which pigments are substantially deaggregated and substantially free of gritty particles. Still more particularly, it relates to a process for the removal of the cementing materials which hold the pigment aggregates together.

Titanium pigments are usually produced by calcination or other heat treatment of a precipitated titanium compound, such as meta-titanic acid obtained by hydrolysis of a titanium sulfate solution. It is well known in the art that such heat treated titanium dioxide contains lumpy particles which are aggregates of fine particles. These lumpy particles are the direct result of sintering agents such as alkali salts which are added to the pigment before calcination in order to control such properties as tinting strength, color, oil absorption, etc., during the manufacturing process. In order to reduce the number of sintered lumps in the finished pigment, the calcined titanium dioxide pigment may be wet ground by the process described by Hanahan in U. S. Patent 1,937,037. However, it has been found at times that during the drying process, cementation of the small pigment particles takes place to form the grit-like lumps found in the dried and disintegrated pigment. The presence of these lumps in the paint film not only tends to eliminate gloss, but also causes the film to appear speckled and unsightly. Furthermore, the amount of time and power required to grind the pigments in enamel formulations to such a point that a high-gloss paint film is obtained, is proportional to the number of gritty particles present in the pigment.

This invention has as an object the production of a substantially grit-free deaggregated titanium pigment. A further object is the production of a substantially deaggregated pigment which is readily mixable in oil or other vehicles with a minimum of paint mill grinding to form a paint film of high gloss and smoothness. A still further object is the production of a substantially grit-free titanium dioxide pigment of extremely low water soluble salt content and consequently a low moisture absorption equilibrium value and for that reason easily disintegrated to form a pigment which is extremely light and fluffy and therefore a very low apparent density making the pigment particularly desirable for the ordinary uses and more especially for cosmetics. A still further object is the production of a titanium dioxide pigment which is substantially deaggregated and substantially free of gritty particles and lower in oil absorption, which property is indicative of lower paint consistency, better mixing, higher hiding characteristics, and more readily ground to a high gloss enamel than the usual titanium dioxide pigment. Other objects will become apparent from an examination of the herein described invention.

Broadly, the present invention comprises digesting a titanium pigment in the form of an aqueous slurry at an elevated temperature and in the presence of a solubilizing agent, followed by a separation from the solubilized cementing materials. The digesting process may be applied to a water ground and elutriated slurry either before or after flocculation or coagulation.

In a more restricted sense, the present invention comprises taking a calcined or other heat-treated titanium dioxide pigment or extended titanium pigment and grinding in accordance with U. S. Patent 1,937,037. This is followed by a digestion of the calcined pigment in the form of an aqueous slurry at a temperature between about 75° C. to 175° C. (resorting to the use of pressure when necessary) under controlled acid, neutral, or alkaline conditions. Depending upon the reagent used, the amount of the added acid, base, or salt, may be varied from fractions of 1% up to 75% based on the weight of the titanium pigment present although generally an amount between about 0.2% to about 30.0% or between about 0.2% to about 10.0% is sufficient. After the aqueous slurry has been heated, the titanium pigment is then separated from the aqueous slurry while the slurry is still hot or after it has been allowed to cool. This may be followed by a series of digestions using the same or different reagents for each digestion or it may be followed by successive refiltrations, or both.

The preferred embodiment of this invention consists in taking a calcined titanium dioxide or calcined extended titanium pigment and wet grinding it in accordance with U. S. Patent 1,937,037. The calcined pigment is then digested in the form of an aqueous slurry at a temperature near 100° C. or higher (resorting to the use of pressure when necessary) under controlled acid, neutral, or alkaline conditions. If the digestion is carried out under acid conditions the use of either hydrochloric acid in an amount less than 15% based on the weight of the titanium pigment present, or boric acid in an amount less than 5% based on the weight of the titanium pigment present, or sulfuric acid in an amount less than 5% based on the weight of the titanium pigment present is preferred. If the digestion is carried out under neutral conditions the use of either calcium chloride or calcium sulfate in an amount less than .40% based on the titanium pigment present is preferred. If the digestion is carried out under alkaline conditions the use of either sodium hydroxide or ammonium hydroxide in an amount less than 5% based on the weight of the titanium pigment present is preferred. The length of time during which the slurry is heated will usually vary from about 30 minutes to twenty hours. Generally, however, it requires about two hours or less of heating. During the heating treatment the slurry may or may not be agitated. However, it is desirable to apply constant agitation during the application of heat. After the heat treatment is completed the titanium pigment is separated from the aqueous slurry with or without a pH adjustment. While the separation may take place after the slurry has been allowed to cool, it is preferred to carry out the separation at elevated temperatures in order that the solubilized cementing agents will not revert to their original insoluble status. This may be followed by a series of digestions using the same reagent or different reagents for each digestion or by successive washings or by both. After the slurry has been finally filtered and dried, it can be disintegrated in the normal way.

The high temperature used in this process also serves to dehydrate any gelatinous material that is present in wet ground titanium oxide thereby preventing it from having a cementing action in the pigment during the drying operation. Such gelatinous material could result from the hydrolysis of alkali titanates which may have been formed during the prior calcination step.

Solubilizing agent as used herein means acids, salts, or bases.

It is understood that the herein described invention may be varied without departing from the scope of the present invention. The process applies equally well to titanium pigments other than white titanium dioxide, for example, the colored pigments prepared by the process of U. S. Patent 2,062,137 or extended pigments containing such inert extenders as barium sulfate, talc, and the like which are added either before or after calcination of the titanium dioxide portion.

This invention is particularly applicable to titanium pigments processed in accordance with Blumenfeld and Mayer U. S. Patent 1,892,693 wherein alkali metal compounds are employed as fritting agents.

The improved results may be obtained in part without resorting to extensive washing subsequent to the digestion treatment and an operation in which an aqueous titanium pigment suspension is heated at an elevated temperature followed by a dewatering operation, is to be considered as within the scope of this invention. By operating in this manner, the improvement is obtained both by the dehydration of the gelatinous material that may have been present in the pigment prior to the heat treatment and by the partial removal of solubilized cementing agents during the dewatering operation.

It is preferred to add the coagulators before digestion although it is understood that it is within the scope of the present invention to add the coagulators after digestion.

While the present invention includes all titanium dioxide pigments, the titanium dioxide pigment processed in accordance with U. S. Patent 1,937,037 is preferred.

Although the digestion process is usually applied to a water ground and elutriated slurry after coagulation, it is within the scope of the invention to apply the digestion process to a slurry made up directly from calcined pigments.

Although the temperatures may vary widely from 75° C. to 350° C. or higher, a temperature near 100° C. or higher is preferred.

Many of the common acids or acid forming substances may be used for the acid reagent. Among the acids which we have used successfully to completely eliminate cementing agents are sulfuric, hydrochloric, boric, and the like. We prefer to employ inorganic acids.

The common alkalis or alkaline earth hydroxides or alkali forming substances may be used for the alkaline reagent. Sodium hydroxide, ammonium hydroxide, potassium hydroxide, sodium carbonate, calcium hydroxide, and the like have been found to be extremely effective as reagents for the digestion process and yield pigments which are grit free and easily and completely dispersed in paint vehicles with very little grinding to give a smooth unbroken paint film. Also, digestion with dilute alkali has been found to be a most effective process, yielding a grit free and completely deaggregated pigment after a single digestion using as little as one per cent (based on the weight of $TiO_2$ present) of the reagent.

Salt solutions have also been found to be suitable reagents for addition to the digestion process as they assist in solubilizing the cementing agents so that they may be subsequently removed. The inorganic salts such as calcium chloride, calcium sulfate, sodium chloride, sodium sulfate, potassium sulfate, potassium chloride, ammonium nitrate, barium chloride and the like are among the salts which yielded pigments free of gritty particles and of excellent color, strength, and general pigment properties. Calcium chloride and calcium sulfate are preferred.

This digestion process is instrumental in solubilizing cementing materials. Thus the water soluble content before digestion approximates 0.2%. The digestion process solubilizes up to 0.4% to 0.7% of cementing materials which may then be removed by filtration or suitable washing. The resulting digested pigment retains only about 0.5% to .12% of soluble salts as determined in the ordinary manner. The following table of experimental data demonstrates this more fully.

| Solubilization agent | Percent solubilized by 16 hrs. refluxing | |
|---|---|---|
| | Undigested | Digested |
| 1% NaOH | .20 | .06 |
| 1% NaOH (2 digestions) | .20 | .05 |
| 10% $H_2SO_4$ | .20 | .12 |
| 10% $H_2SO_4$ (2 digestions) | .20 | .07 |

To indicate the type of cementing material removed, for instance, successive water digestions effected removal of solubilized material from a titanium dioxide pigment which material on analysis was found to consist of 7.3% $P_2O_5$, 10.4% $SiO_2$, 18.0% $SO_3$, along with small amounts of Na, K, Ca, Mg, and Ti, and a loss on ignition of 33.4%.

In order to further clearly demonstrate the effect of the digestion process upon the finished pigment the following test has been employed. A standard weight of finished dry pigment is mixed in the ratio of 65/35 with a four-hour white enamel grinding varnish. This paste is then passed once thru a paint roller mill set accurately in such a way that the rolls are exactly .0015 inch apart. After grinding the paste is reduced to a pigment vehicle ratio of 50/50 with more of the original varnish. The resultant enamel is drawn down on a plain glass plate to form a film of uniform thickness equal to that of the mill clearance given above. This uniform film thickness is obtained by placing two metal strips of .0015 inch thickness about three inches apart on the glass plate, and drawing down about two cubic centimeters of the enamel with a machine-planed straight edge. After drying, the film is compared against arbitrary permanent standards prepared in the same manner. The standard drawdowns range from "zero," representing an extremely poor pigment containing an exceedingly large amount of the gritty cemented particles, to "18" which represents a pigment entirely free of grit and cemented or aggregated particles, the film being smooth, unbroken, and high in gloss. On the basis of this test the paint grit test slides made from untreated titanium pigments are graded over a wide range, namely from 4 to 14, depending on the particular conditions of operation under which the pigments were made. Titanium dioxide pigments which were treated by this digestion process are graded from 15 to 18, depending upon the character of the basic pigment, and the type of digestion treatment used.

The practical embodiment of the operation of this process is given in the following examples. These examples are given merely for purposes of illustration and the details of operation are not intended to limit the scope of this invention in any way.

Example I 10,000 parts by weight of calcined titanium dioxide pigment which had been elutriated and wet ground under alkaline conditions, coagulated with $MgSO_4$ and adjusted to pH 7 with $H_2SO_4$, was allowed to settle to a slurry concentration of about 400 grams of $TiO_2$ per liter. This material was diluted with water to a slurry concentration of 150 grams per liter. Based on the weight of $TiO_2$ present 10% or 1000 parts by weight of HCl, calculated as such was added. The treated slurry was brought to a boil at 100° C., and held at that temperature with constant agitation for two hours. The batch was then allowed to cool to 70° C., and filtered immediately. The filter cake was washed with water at 70° C., by displacement, using eight parts of water per part of $TiO_2$. The washed cake was then reslurried with water to a pulp concentration of 150 grams of $TiO_2$ per liter, allowed to stand for sixteen hours and neutralized to pH 7 with NaOH. The neutralized slurry was filtered and washed further with two parts of water per part of $TiO_2$. This cake was dried at 175° C., and disintegrated in a high speed hammer type disintegrator. The finished pigment obtained by this procedure was graded 17 on the paint grit scale, which means that it was very nearly perfect in respect to its grit properties, the drawdown film being almost free of undispersed pigment particles, and high in gloss. The amount of solubilized material removed in this case was equivalent to .7% of the weight of the pigment, although undigested pigment from the same source contained only .2% water soluble material.

Example II

Calcined titanium dioxide pigment which was in the form of a slurry, the $TiO_2$ concentration of which was 350 grams per liter and which had been elutriated and subsequently coagulated, was diluted with water to a slurry concentration of 120 grams of $TiO_2$ per liter. To this slurry was added boric acid in amount equivalent to 1% based on the weight of $TiO_2$ present. This mixture was brought to a boil and held at the boiling point for one hour, after which period the slurry was allowed to settle for several hours without agitation, the clear supernatant liquid being decanted and the slurry being further dewatered by filtration and dried without pH adjustment. This digestion resulted in a pigment of a grit rating of 15, which represented a paint film with very few undispersed aggregated lumps, and consequently of high gloss. The resultant pigment was also high in tinting strength and of excellent color.

Example III

A sample of calcined titanium dioxide pigment which had been dry ground directly after calcination was extremely poor in fineness characteristics, the grit test film appearing to consist entirely of lumpy cemented particles and being rated 5 on the grit scale. Digestion of this material, when repulped in water to 150 grams of $TiO_2$ per liter was carried out by adding sodium hydroxide in amount equivalent to 1% based on the weight of $TiO_2$ present, and then bringing the mixture to a boil. The remainder of the digestion procedure was then carried out in exactly the same manner as that given in Example I, except that $H_2SO_4$, instead of NaOH, was needed to neutralize the washed slurry. The paint grit rating of 8 obtained of the finished titanium dioxide pigment was not perfect, but represented a considerable and substantial improvement over the base pigment, particularly in that grinding in a paint formulation to a smooth enamel was performed in a shorter time.

Example IV 100 parts by weight of calcined titanium dioxide pigment which was in the form of a water slurry, the concentration of which was 350 grams of $TiO_2$ per liter, which had been water ground and elutriated under alkaline conditions and coagulated, was diluted with 150 parts of water, and placed in an autoclave. The pressure was raised to approximately 50 pounds per square inch, giving a temperature of 140–150° C. This temperature was held for two hours after which period the pressure was released and the dilute $TiO_2$ slurry filtered and washed as Example I. No neutralization or secondary washing was given, the pigment being dried immediately upon filtration. The grit test rating on the pigment after disintegration was 15, indicating that the pigment was almost completely free of gritty particles.

Example V 100 parts by weight of calcined titanium dioxide in the form of a water slurry which had been water ground and elutriated under alkaline conditions, and coagulated and diluted to 150 grams of TiO₂ per liter, was treated with one part of sodium hydroxide and the mixture heated to 100° C. After being held at this temperature for two hours, it was cooled and washed in the same manner as Example I, using sulfuric acid for neutralizing the washed and diluted cake. A portion of this digested titanium dioxide slurry was filtered, dried, and disintegrated. The grit test rating on this portion of the material was 16. The remainder of the treated material was retreated with 1% of sodium hydroxide, based on the weight of the TiO₂ present, and digested for two hours at 100° C., cooled, filtered, and washed in the same manner as before. The dried pigment was disintegrated and tested for grit. The grit test rating was 18, which signified a perfect film with no undispersed particles present, having a smooth unbroken highly glossy surface.

*Example VI*

Calcined titanium dioxide pigment in the form of a water slurry, a TiO₂ concentration of 350 grams per liter, which had been water ground, elutriated, and subsequently coagulated, was treated with 1% of ammonium hydroxide based on the weight of TiO₂ present, and digested at the boiling point for one hour, filtered, repulped in water, refiltered, dried and disintegrated. The resultant pigment was excellent, being almost completely free of grit, and easily dispersed in paint vehicles. The grit test rating given this pigment was 17.

*Example VII*

A calcined titanium dioxide pigment in the form of a water slurry, at a concentration of 100 grams of TiO₂ was digested in 400 grams per liter of 31% sulfuric acid solution for one hour at the boiling point. This digested slurry was then filtered while hot, repulped in water and refiltered five successive times, neutralizing to pH 7.3 before the last filtration. When dried and disintegrated, the pigment was tested by the paint grit test, and the draw down slide was rated 15, as the film was practically free of grit, and glossy.

*Example VIII*

To calcined titanium dioxide pigment which had been water ground under alkaline conditions, .25% of CaCl₂.2H₂O was added along with .08% of H₂SO₄, which produced a neutral slurry, the pH of which was 7.0. The neutral slurry was then boiled for 30 minutes, filtered and the digestion repeated and then refiltered and dried. The dried pigment was excellent in color, tinting strength, and other pigment properties. It was practically free of gritty and aggregated particles, and the paint grit test slide was smooth and high in gloss, being rated 15.

*Example IX*

13.5 tons of calcined, alkaline elutriated, and coagulated titanium dioxide pigment as 350 grams per liter slurry was pumped into a tank equipped with an agitator. This slurry was treated with .25% H₂SO₄ (based on TiO₂) to give pH of 2.5. With agitation, the batch was brought to a temperature of 93° C. in 17 hours, by direct addition of steam, which caused a dilution to 285 grams of TiO₂ per liter. Over a five hour period the temperature was held at 85° C. or above by intermittent steam addition. This mixture was then diluted with water to a final slurry concentration of 97 grams of TiO₂ per liter, the temperature being reduced to 58° C. The agitator was then turned off and the pigment allowed to settle, and the clear supernatant liquid was decanted to give a slurry of 234 grams of TiO₂ per liter and pH of 3.3. Neutralization to pH 7.2 was obtained by the addition of NaOH equivalent to .13% by weight based on the TiO₂ in the slurry. This slurry was then filtered, dried, and disintegrated in the normal way. By this process a three point improvement in the paint grit test rating was obtained, but as the base pigment was exceptionally poor (paint grit rating of 6), the acid digested pigment represented an improved product being rated 9 on the paint grit scale. While the final product of this particular digestion is far from perfect, it is a substantially improved product in regard to the ease of grinding with a tight paint mill setting.

Having described the present invention the following is claimed as new and novel:

1. A process for producing a titanium containing pigment substantially-free from grit particles which comprises digesting a calcined titanium dioxide pigment under controlled acidic conditions for at least thirty minutes at a temperature above 75° C.

2. A process for producing a titanium containing pigment substantially-free from grit particles which comprises digesting a slurry of a calcined titanium dioxide pigment containing from about 0.2% to about 30.% of an added acidic compound for a period of at least thirty minutes at a temperature above 75° C.

3. A process for producing a titanium containing pigment substantially-free from grit particles which comprises digesting a slurry of a calcined titanium dioxide pigment containing from about 0.2% to about 30.% of a mineral acid for a period of at least thirty minutes at a temperature between about 75° C. and about 175° C.

4. A process for producing a titanium containing pigment substantially free from grit particles which comprises digesting an aqueous solution of a calcined titanium dioxide containing pigment under alkaline conditions for at least thirty minutes at a temperature above 75° C.

5. A process for producing a titanium containing pigment substantially-free from grit particles which comprises digesting an aqueous solution of a calcined titanium dioxide pigment containing from about 0.2% to about 30.% of added alkaline compound for a period of at least thirty minutes at a temperature between about 75° C. and about 175° C.

6. A process for producing a titanium containing pigment substantially-free from grit particles which comprises digesting an aqueous solution of a calcined titanium dioxide pigment containing from about 0.2% to about 10.% of added caustic soda for a period of at least thirty minutes at a temperature above 75° C.

7. A process for producing a titanium containing pigment substantially-free from grit particles which comprises digesting a slurry of a calcined titanium dioxide pigment containing from about 0.2% to about 10.% of added dilute acid for a period of at least thirty minutes at a temperature of about 100° C.

8. A process for producing a titanium containing pigment substantially-free from grit particles which comprises digesting an aqueous solution of a calcined titanium dioxide pigment containing from about 0.2% to about 10.% of added dilute alkali for a period of at least thirty minutes at a temperature of about 100° C.

9. A process for producing a titanium containing pigment substantially-free from grit particles which comprises digesting a slurry of a calcined titanium dioxide pigment containing from about 0.2% to about 30.% of added inorganic salts for a period of at least thirty minutes at a temperature above 75° C.

10. A process for producing a titanium containing pigment substantially-free from grit particles which comprises digesting a slurry of a calcined titanium dioxide pigment containing from about 0.2% to about 10.% of added dilute salt for a period of at least thirty minutes at a temperature of about 100° C.

11. A process for producing an improved titanium containing pigment which comprises digesting a calcined titanium dioxide pigment suspended in an aqueous solution the solute of which is between a fraction of 1% up to 75%, based on the weight of the titanium pigment present, of a solubilizing agent selected from the class consisting of mineral acids, alkalis, and inorganic salts, at a temperature above 75° C. for a sufficient length of time to produce an unaggregated pigment.

WILLARD H. MADSON.
WILLIAM H. DAIGER.